United States Patent
Haas et al.

(10) Patent No.: US 10,931,148 B2
(45) Date of Patent: Feb. 23, 2021

(54) WAVEFORM DESIGN FOR RF POWER TRANSFER

(71) Applicant: Board of Regents, The University of Texas System, Austin, TX (US)

(72) Inventors: Zygmunt Haas, Richardson, TX (US); Zhong Zheng, Richardson, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 159 days.

(21) Appl. No.: 15/959,917

(22) Filed: Apr. 23, 2018

(65) Prior Publication Data

US 2018/0323656 A1 Nov. 8, 2018

Related U.S. Application Data

(60) Provisional application No. 62/500,026, filed on May 2, 2017.

(51) Int. Cl.
*H02J 50/20* (2016.01)
*G06K 19/07* (2006.01)
*H01Q 1/24* (2006.01)
*H02J 50/40* (2016.01)
(Continued)

(52) U.S. Cl.
CPC .......... *H02J 50/20* (2016.02); *G06K 19/0709* (2013.01); *H01Q 1/2225* (2013.01); *H04B 5/0031* (2013.01); *H04B 5/0037* (2013.01); *H04B 5/0062* (2013.01); *H01Q 1/248* (2013.01); *H02J 50/40* (2016.02)

(58) Field of Classification Search
CPC .. H02J 50/12; H02J 50/10; H02J 50/20; H02J 50/40; H02J 7/00; H02J 7/025; H02J 5/00; H02J 5/005; G06K 19/07; H01Q 1/24
USPC ................................ 307/104, 66, 64, 80, 82
See application file for complete search history.

(56) References Cited

U.S. PATENT DOCUMENTS

| | | | |
|---|---|---|---|
| 8,199,689 B2 * | 6/2012 | Maltseff | G06K 7/10237 370/312 |
| 8,922,347 B1 * | 12/2014 | de Rochemont | H01Q 9/26 340/10.4 |
| 9,985,461 B2 * | 5/2018 | Chen | H02J 50/20 |

(Continued)

OTHER PUBLICATIONS

Bharadia, et al.; "BackFi: High Throughput WiFi Backscatter"; in Proc. ACM Sigcomm '15; Aug. 2015; pp. 283-296.

(Continued)

*Primary Examiner* — Rexford N Barnie
*Assistant Examiner* — Jagdeep S Dhillon

(57) ABSTRACT

A passive tag transponder circuit comprising a receive antenna, reflect antenna, and rectifier network. The receive antenna can be configured to receive an ambient RF signal having a frequency of fc, or, a backscattered RF signal having a frequency of 2fc. The reflect antenna can be configured to receive a rectified output signal from the rectifier network, the rectified output signal having a frequency of $2f_c$. The reflect antenna can be configured to send a backscattered signal at the frequency of $2f_c$. The rectifier network can be connected to receive an input corresponding to the ambient RF from the receive antenna and send the rectified output to the reflect antenna.

12 Claims, 4 Drawing Sheets

Figure 1:
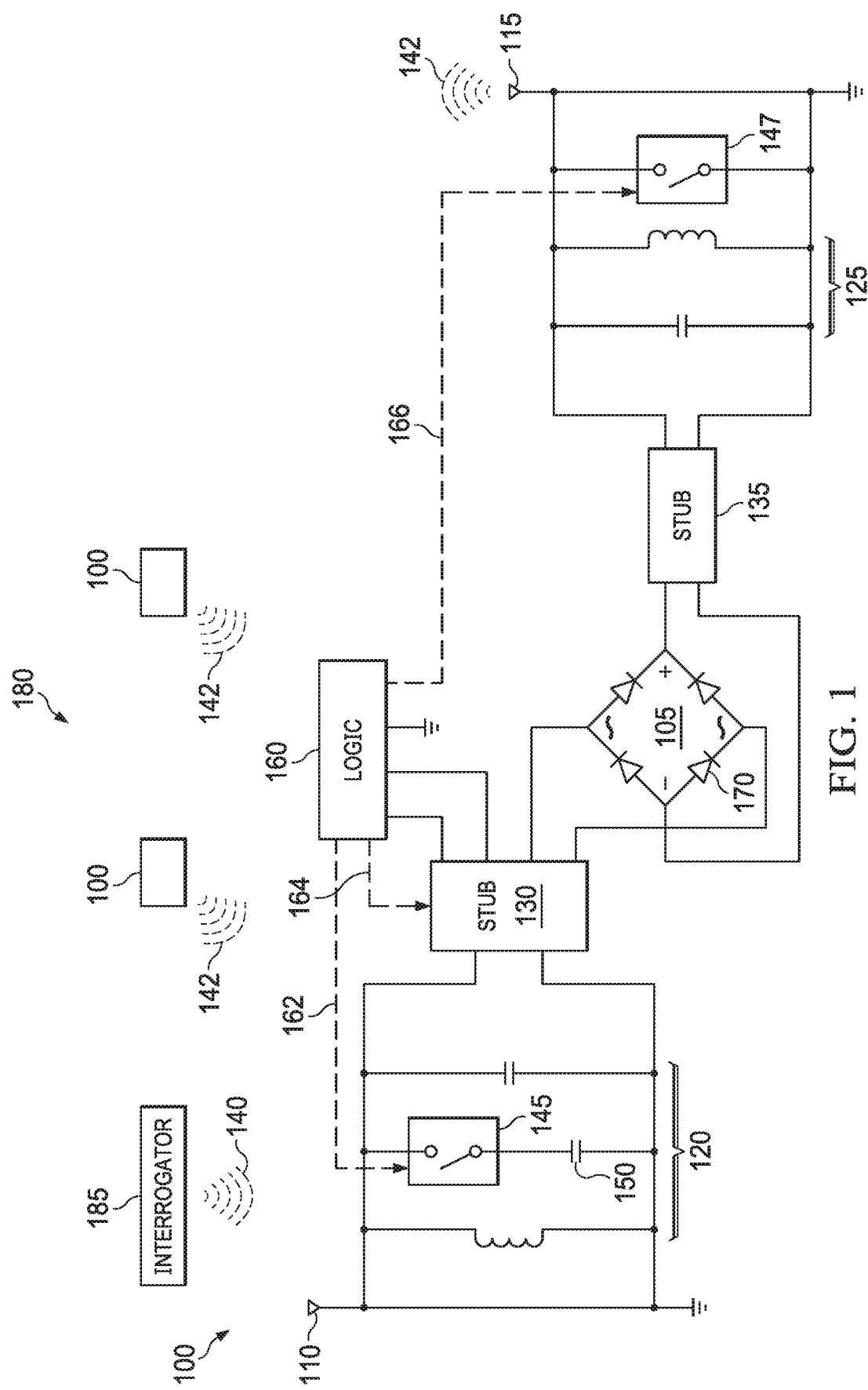

(51) Int. Cl.
*H01Q 1/22* (2006.01)
*H04B 5/00* (2006.01)

(56) References Cited

U.S. PATENT DOCUMENTS

| | | | | |
|---|---|---|---|---|
| 10,079,616 | B2* | 9/2018 | Reynolds | H04L 27/2602 |
| 10,338,205 | B2* | 7/2019 | Zhang | H04B 5/00 |
| 2003/0119474 | A1* | 6/2003 | Kimura | H04B 1/30 |
| | | | | 455/333 |
| 2006/0132302 | A1* | 6/2006 | Stilp | H04L 12/2825 |
| | | | | 340/539.22 |
| 2006/0145842 | A1* | 7/2006 | Stilp | H04L 12/2825 |
| | | | | 340/539.22 |
| 2015/0091706 | A1* | 4/2015 | Chemishkian | H02J 50/20 |
| | | | | 340/10.34 |
| 2015/0227768 | A1* | 8/2015 | Frederick | G06K 7/10009 |
| | | | | 340/10.1 |
| 2015/0229133 | A1* | 8/2015 | Reynolds | H04W 52/24 |
| | | | | 307/24 |
| 2016/0196455 | A1* | 7/2016 | Gudan | H04B 5/0062 |
| | | | | 340/10.5 |
| 2017/0180178 | A1* | 6/2017 | Gollakota | H04B 7/0413 |
| 2017/0286820 | A1* | 10/2017 | Nikunen | G06K 7/10009 |
| 2017/0337405 | A1* | 11/2017 | Schutz | G06K 19/07758 |
| 2019/0274144 | A1* | 9/2019 | Zhang | H04B 1/0003 |

OTHER PUBLICATIONS

Thomas, et al.; "A 96 Mbit/sec, 15.5 pJ/bit 16-QAM Modulator for UHF Backscatter Communication"; in Proc. IEEE Int. Conf. RFID, Apr. 2012; 6 pgs.

Zhang, et al.; "Enabling Practical Backscatter Communication for On-body Sensors"; in Proc AMC Sigcomm; Aug. 2016; 14 pgs.

* cited by examiner

WAVEFORM DESIGN FOR RF POWER TRANSFER

CROSS-REFERENCE TO RELATED APPLICATION

This application claims the benefit of U.S. Provisional Application Ser. No. 62/500,026, filed by Zygmunt Haas, et al. on May 2, 2017, entitled "CIRCUIT AND WAVEFORM DESIGN FOR RF POWER TRANSFER," commonly assigned with this application and incorporated herein by reference.

TECHNICAL FIELD

This application is directed, in general, to power transfer using electro-magnetic waves, including radiofrequency power transfer circuits and, more specifically, to passive tag transponder circuits of radio frequency tag-to-tag communication systems.

BACKGROUND

Tag-to-tag communication systems such as radio frequency identification (RFID) systems often include three components. An interrogator/reader transmits a radio frequency (RF) continuous wave (CW) to power the passive tags and provides an ambient RF signal to carry the tag information. A sender tag (ST) backscatters the impinging CW with information modulated in the backscattered RF. A reader tag (RT) decodes information stored in the backscattered RF. Tag-to-tag communications between a pair of passive RFID tags has been demonstrated, where the communicating tags do not have energy source of their own and are powered by an external RFID interrogator. However the performance of such tag-to-tag communications can be limited to short distances between tags and can be subject to interference from other communicating tags and to interference from the stronger powering ambient RF signal.

SUMMARY

One embodiment of the disclosure is a passive tag transponder circuit, comprising a receive antenna, reflect antenna and rectifier network. The receive antenna can be configured to receive an ambient RF signal having a frequency of $f_c$, or, a backscattered RF signal having a frequency of $2f_c$. The reflect antenna can be configured to receive a rectified output signal from the rectifier network, the rectified output signal having a frequency of $2f_c$ and the reflect antenna can be configured to send a backscattered signal at the frequency of $2f_c$. The rectifier network receives an input corresponding to the ambient RF from the receive antenna and send the rectified output to the reflect antenna.

Some embodiments of the circuit can further include a first LC circuit connected to the receive antenna, wherein the first LC circuit is switchably configured to tune the receive antenna to the frequency of $f_c$, or, to the frequency of $2f_c$. For some such embodiments, the circuit can further include a first impedance matching stub connected to the first LC circuit and switchably configured to feed the input to the rectifier network, or, to a logic circuit of the transponder circuit.

Some embodiments of the circuit can further include a second impedance matching stub connected to the rectifier network and to a second LC circuit. The second LC circuit can be connected to the reflect antenna, and the second LC circuit can be configured to tune the reflect antenna to the frequency of $2f_c$. For some such embodiments, the circuit can include a switch connected to the second LC circuit and the switch can be configured to switch loads attached to the reflected antenna to have different impedances for representing information bits.

Any such embodiments can further include a logic module. The logic module can be connected to switch the receive antenna to be tuned the frequency of $f_c$, or, the frequency of $2f_c$. The logic module can be connected to switch the input corresponding to the ambient RF to the rectifier network, or, switch an input from the receive antenna corresponding to the backscattered RF signal to the logic module. The logic module can be connected to switch between open and short circuits of the reflect antenna to modulate information bits onto the backscattered RF signal sent by the reflect antenna. Any embodiment of the logic module can further include a demodulation circuit configured to demodulate the backscattered RF signal fed to the logic circuit.

In any such embodiments of the transponder circuit the receive antenna and the reflect antenna can be combined in a single antenna. In any such embodiments of the circuit, the rectifier network can have four Schottky diodes.

Any such embodiments of the transponder circuit, as part of a tag-to-tag communication system, can have an interrogator configured to transmit the ambient RF signal at the frequency $f_c$. For any such embodiments, the ambient RF signal can have a sinusoid continuous waveform. For any such embodiments, the ambient RF signal can have a modified continuous waveform such that the rectified output has substantially no harmonic frequencies greater than 2fc.

BRIEF DESCRIPTION

Figure 2:
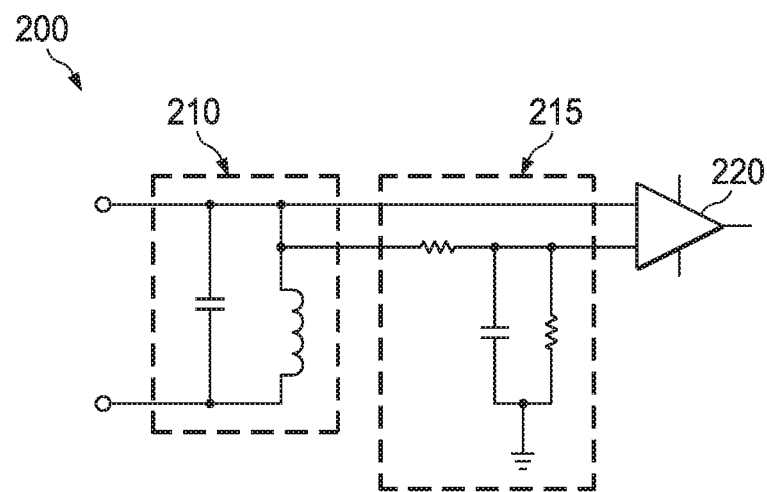
Figure 3A:
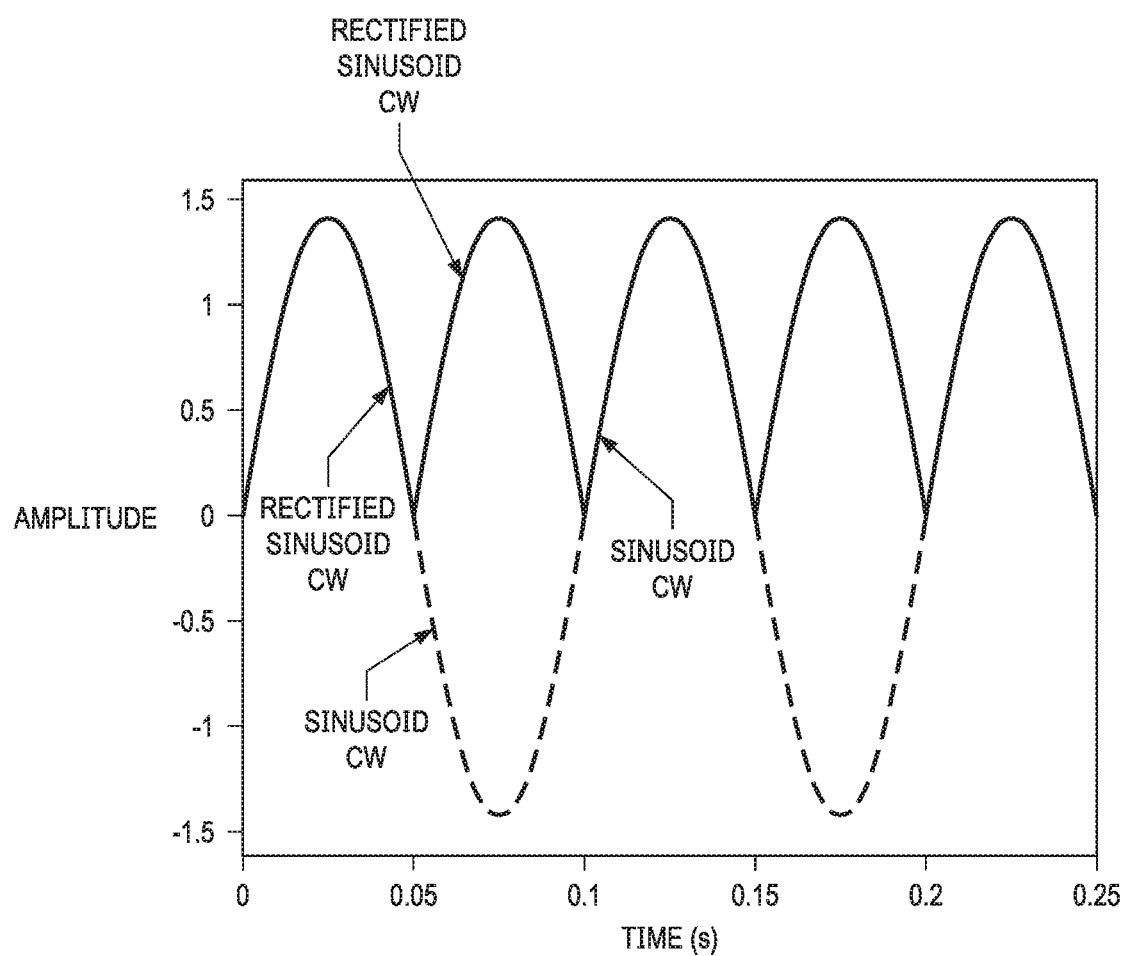
Figure 3B:
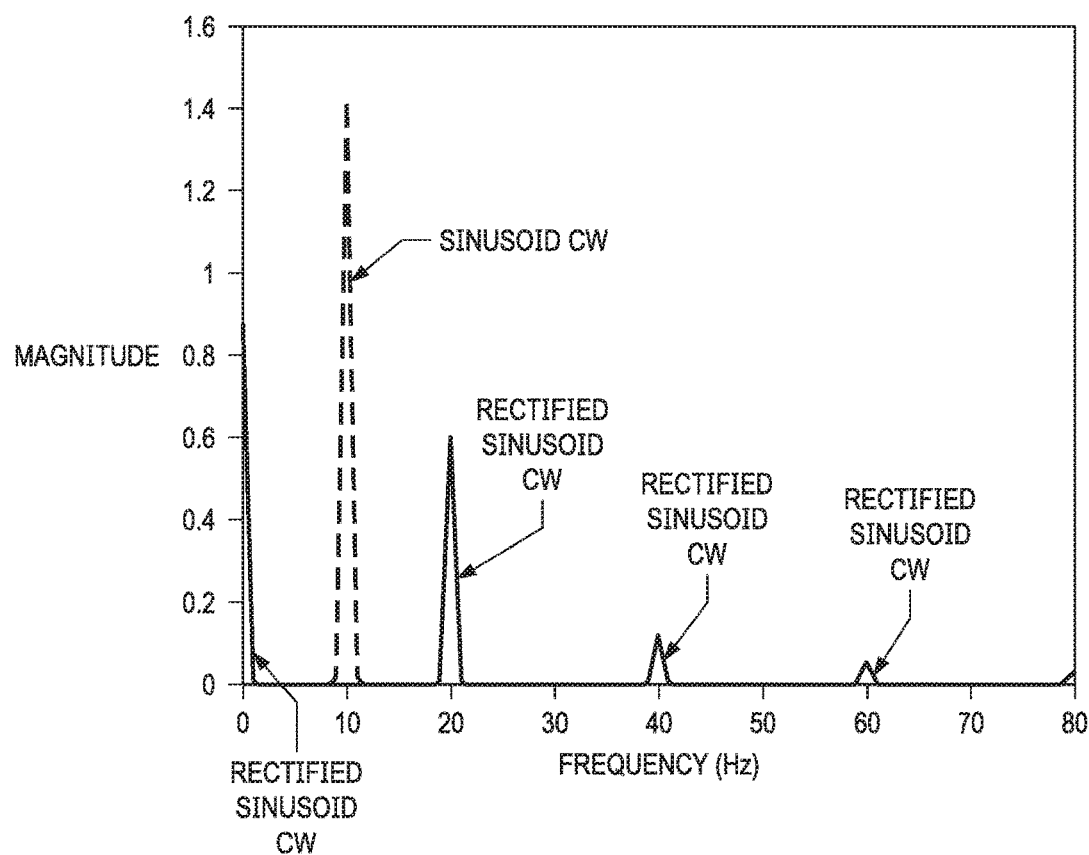
Figure 4A:
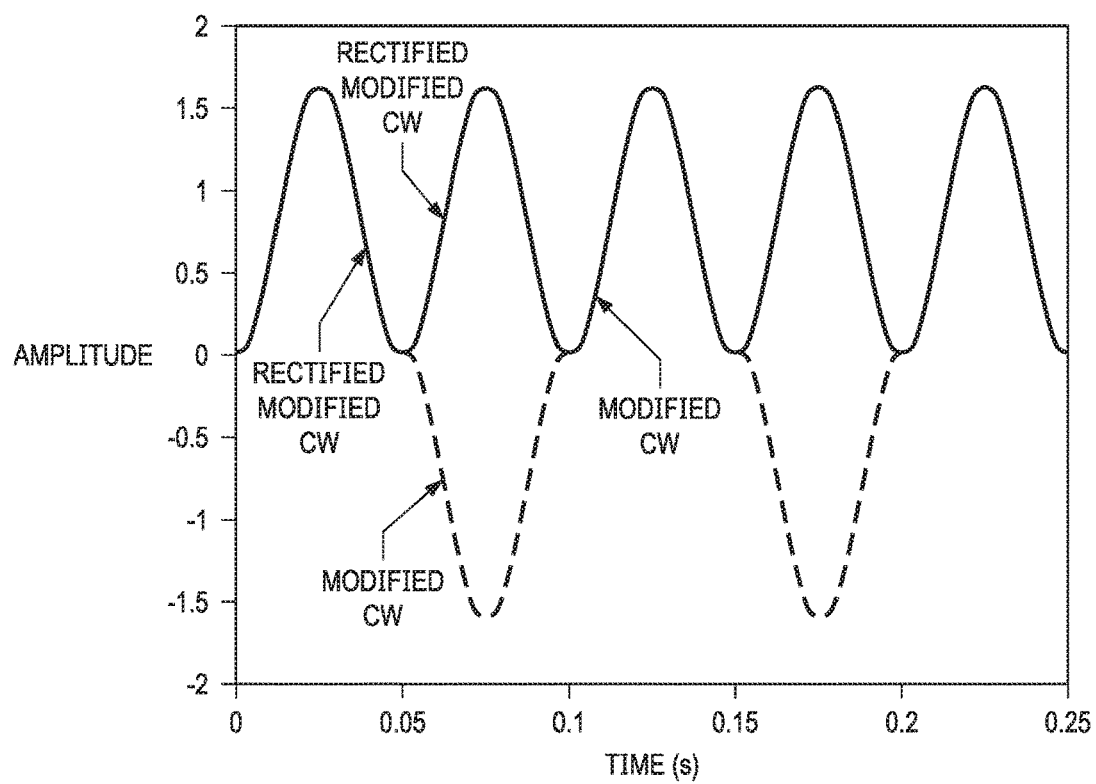
Figure 4B:
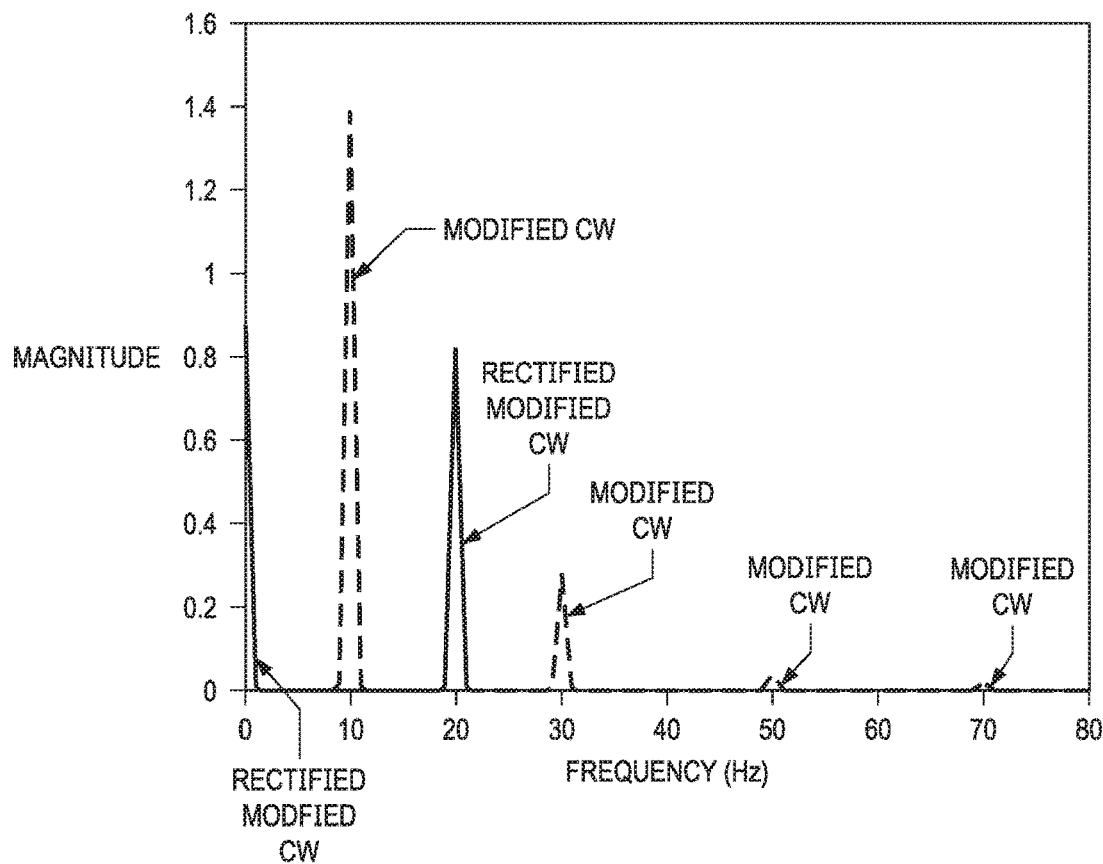
Figure 5:
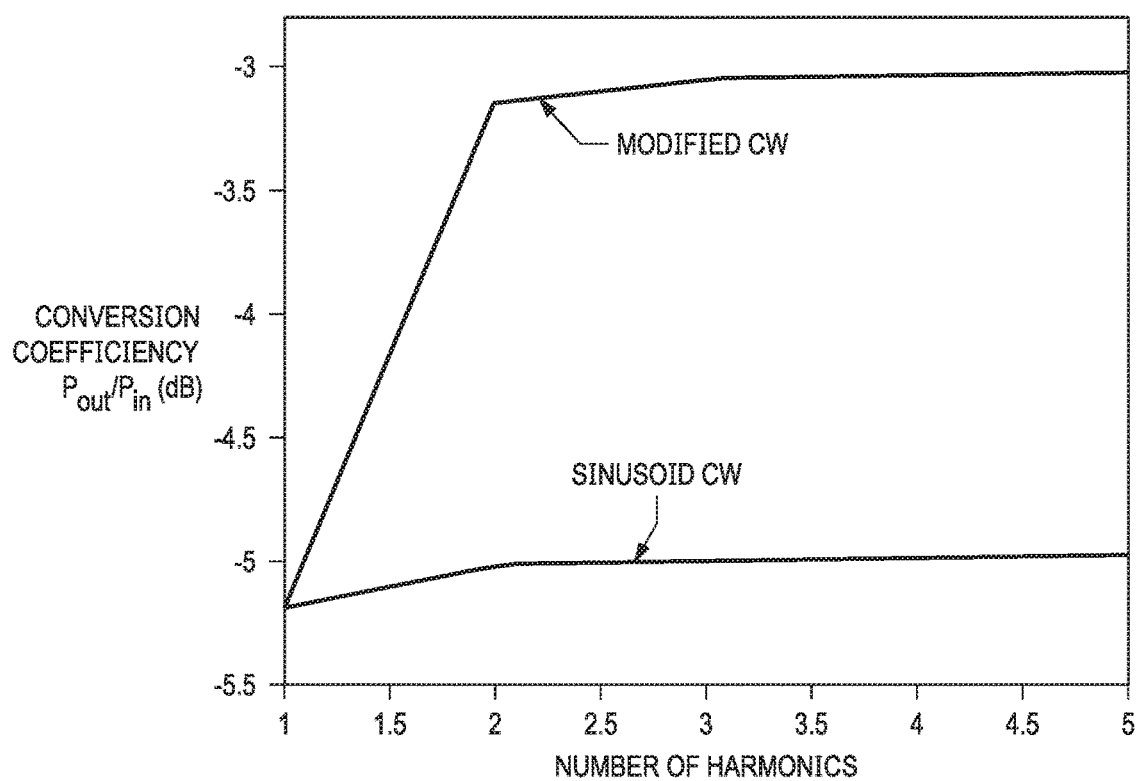

Reference is now made to the following descriptions taken in conjunction with the accompanying drawings, in which:

FIG. 1 presents an example passive tag transponder circuit of the disclosure;

FIG. 2 present an example demodulation circuit of a logic component of the transponder circuit of the disclosure such as the circuit depicted in FIG. 1;

FIGS. 3A and 3B presents time (A) and frequency (B) representations of RF input and output of a sinusoidal CW waveform interacting with the circuit shown in FIG. 1 where the dashed lines denotes the input sinusoidal CW and the solid lines denotes the output rectified sinusoidal CW;

FIGS. 4A and 4B presents time (A) and frequency (B) representations of RF input and output for the disclosed modified CW waveform interacting with the circuit shown in FIG. 1, where dashed lines denotes the input modified CW and solid line denotes the output rectified modified CW; and FIG. 5 presents a comparison of conversion efficiencies using the sinusoid CW waveform and the disclosed modified CW waveform as discussed in the context of FIGS. 3A, 3B, 4A and 4B, respectively.

DETAILED DESCRIPTION

Embodiments of the disclosure benefit from our recognition that interference from the ambient RF signal on the backscattered signal can be mitigated by using transponder circuit that rectifies the waveform of the impinging CW. As further disclosed herein, when passed through the disclosed rectifier network of the circuit, the rectified CW results in the frequency of the backscattered RF signal being doubled as compared to the frequency of the ambient RF signal, to thereby separate the backscattered signal from the ambient RF signal. Separating the backscattered signal from the ambient RF signal, facilitates reducing the interference from the ambient RF signal on the backscattered signal. Further, the waveform of the impinging CW can be modified such that potential loss of power present in higher harmonics of the CW, when passed through the rectifier network, is eliminated, with a corresponding increase in the power of the backscattered RF signal at the doubled frequency, to facilitate an improved efficiency of the backscattering operation.

As further disclosed herein, embodiments of the disclosure can reduce interferences from other communicating tags or from the stronger powering ambient RF signal, and maximize the power that is available for the communicating tags. Embodiments of the disclosure can use, among other approaches, a passive frequency shifting of the interrogator's energy, so as to significantly reduce the interference of the stronger powering ambient RF signal. Embodiments of the disclosure can use, among other approaches, a special waveform design of the interrogator's CW that maximizes the energy transfer from passive frequency shifting components to the backscattering portion of a tag.

FIG. 1 presents an example of passive tag transponder circuit 100 of the disclosure having a rectifier network 105. FIG. 2 presents an example demodulation circuit 200 of a logic component of a circuit of the disclosure, such as the circuit 100 depicted in FIG. 1.

As illustrated in FIG. 1, the circuit 100 can include a receive antenna 110, and a reflect antenna 115. In the illustrated circuit 100, for clarity, in FIG. 1, separate receive and the reflect antennas are depicted. However, in other embodiments of the circuit 100, a single antenna, serving as both the rectifier and the reflect antenna, could be used.

As further illustrated in FIG. 1, the circuit 100 can include first and second LC circuits 120, 125 (inductor-capacitor circuit or resonant circuit) connected to one of the antennas 110, 115, respectively. The LC circuits 120, 125 are connected to the rectifier network 105 through impedance matching stubs (e.g., first and second stubs 130 and 135, respectively). The stubs 130, 135 are tuned to match the impedance seen by the rectifier network 105. One skilled in the pertinent art would be familiar with appropriate high-Q property LC circuit and impedance matching stub designs to facilitate efficient energy transfer of the ambient RF signal (e.g., ambient RF signal 140) and backscattered RF signal (e.g., backscattered RF signal 142) to and from respective antennas of the circuit 100.

As further illustrated for the circuit 100 depicted in FIG. 1, the circuit 100 can further include a first switch 145 in parallel with the first LC circuit 120 and a second switch 147 in parallel with the second LC circuit 125. In some embodiments, the first switch 145 can be in series with a capacitor 150 to facilitate alternative frequency tuning of the receive antenna 110, as further disclosed below. The circuit 100 can further include a logic module 160 configured to control the switches 145, 147 and stub 130, as further disclosed below.

With continuing reference to FIGS. 1 and 2, methods of operating the circuit 100, when in a sender tag (ST) state or in a reader tag (RT) state, are disclosed.

When the switch 145 at the receive antenna 110 is open (e.g., as controlled by the logic component 160, via switch signal 162) and the stub 130 is switched (e.g., as controlled by the logic circuit 160, via switch signal 164) to connect to the rectifier network 105, then the circuit 100 is in a ST state. The receive antenna 110 is thereby tuned to the frequency of a CW, $f_c$, e.g., corresponding to the ambient RF signal 140. The received CW is fed to the rectifier network 105.

After rectifying, the output voltage of the recitifier network 105 can be substantially equal to the absolute value of the input voltage (e.g., within 10% of the absolute value of the input voltage). However, in some embodiments, the actual output voltage can be scaled down more (e.g., the output voltage is more than 10% less than the absolute value of the input voltage) due to power loss of the rectifier network 105.

When the input CW is a sinusoid wave, the output of the rectifier network 105 in time and frequency domains is illustrated in FIGS. 3A and 3B, respectively. In this example embodiment, for clarity, the frequency of the CW is set to $f_c$=10 Hz. However, in other embodiments, the frequency of the CW can be within any frequency band (e.g., low, high, ultra high or microwave frequency ranges) appropriate for industrial or other uses.

Note that the spectrum of the rectified waveform (e.g., FIG. 3B) consists of a DC component and harmonic frequencies at $2kf_c$ with k being a non-negative integer. By Fourier analysis, the amplitudes of the DC and the harmonic components for such an embodiment are given by equation (1):

$$a_{2k} = \frac{4}{\pi} A_c \left( \frac{1}{4k^2 - 1} \right). \tag{1}$$

The output of the rectifier network 105 is fed to the reflect antenna 115, which is tuned (e.g., as faciliated by the second LC circuit 125) to the harmonic frequency $2f_c$. By switching between open and short circuits of the reflect antenna 115 (e.g., via second switch 147 as controlled by the logic module 160 via switch signal 166), the tag's information bits can be modulated onto the reflected waveform (e.g., as part of the backscattered RF signal 142).

When the first switch 145 is closed, the circuit 100 is in a RT state. The LC circuit 120 is thereby tuned to the frequency $2f_c$ and is used as a passband filter, e.g., to receive a backscattering signal (e.g., an RF signal 142 sent by another such circuit 100 when in a ST state). The logic module 160 connected to the first stub 130 can configure the stub 130 (e.g., via control signal 164) to switch the input (e.g. corresponding to the backscattered RF signal 142) from the receive antenna 110 to the logic module 160. The logic module 160 connected to the stub 130 can include circuitry 200 that is designed to detect whether there exists a frequency component at $2f_c$ and then demodulate such a frequency component, if present.

An example demodulation circuit 200 of the logic module 160 is shown in FIG. 2. The demodulation circuit 200 can include an LC circuit 210, a threshold computing circuit 215, and comparator circuit 220. The demodulation circuit 200 can be configured to compute the long-term average voltage of the input signal (e.g., the input RF signal fed from the stub 130 to the LC circuit 210 and to the threshold computing circuit 215) and a comparator 220 of circuit 200 can be configured to produce either a one or a zero if the voltage of the input signal is above or below the average level, respectively. Based on the present disclosure one of ordinary skills in the art would appreciate how other modulation schemes could be used. The logic module 160 can be programmed to switch (e.g., via switch 147) the loads attached to the reflected antenna 115, so as to have different impedances to represent the information bits.

In view of the present disclosure, one skilled in the pertinent art would understand how other modulation schemes, such as amplitude-shift keying and phase-shift keying, could be combined with the disclosed frequency shifting architecture.

In some embodiments, the performance of the circuit 100 in the RT state can be improved by using a passband filter (e.g., LC circuit 120 or LC circuit 210) attached to the receive antenna 110 with a bandwidth sufficiently wide to combine the power of other harmonics (e.g., harmonics greater than $2f_c$ such as harmonics defined by $(2k-1)f_c$, where k=2, 3, or 4), which exhibits a tradeoff between the performance and the implementation complexity/cost.

Next is disclosed an example waveform design for the CW to facilitate improved performance as compared to using a sinusoid CW. The advantage of the modified waveform is that the power of the rectified waveform concentrates at the DC and the frequency $2f_c$ only, while other harmonic components are substantially eliminated. That is, the rectified signal has substantially no harmonic frequencies greater than $2f_c$, meaning that the signal whose power of the harmonics is greater than $2f_c$ is a small fraction, e.g., less than about 10 percent, of the power of the harmonics less than or equal to $2f_c$. Having substantially no harmonic frequencies greater than $2f_c$ faciliates maximum transfer of energy to the backscattering operation. For the rectifier network 105 disclosed in FIG. 1, the modified CW has the following waveform:

$$x(t)=\text{sign}(\sin 2\pi f_c t)\cdot\sqrt{2/3}A_c(\cos(4\pi f_c t+\pi)+1), \quad (2)$$

where sign(y) denotes the signum function and it equals 1 when y>0 and equals −1 when y≤0. The first term on the righthand side of equation 2 is a period square function with frequency $f_c$. The coeffecient $\sqrt{(2/3)}$ is used to normalize the power of x(t). The output of the rectifier network 105 is given by equation 3:

$$\tilde{x}(t)=\sqrt{2/3}A_c(\cos(4\pi f_c t+\pi)+1) \quad (3)$$

FIGS. 4A and 4B present illustrations of the time and frequency representations of the proposed CW x(t), and the output of the rectifier network 105, $\tilde{x}(t)$. It is noted that the spectrum of the modified CW consists of harmonics at frequencies $(2k-1)f_c$, where k≥1 are positive integers. However, the spectrum of the rectified modified waveform consists of the DC component and a single AC component at the frequency $2f_c$. In order to obtain a good approximation of the desired rectified waveform, the LC filter (e.g., LC circuit 120) attached to the receive antenna 110 can be configured to have sufficient bandwidth to admit the higher harmonics of CW having significant amplitude (e.g., harmonics having at least 10 percent of the total power of the input of the rectifier network 105).

From equation 3, we confirmed that the rectified modified waveform has equal power at the DC component and at the frequency $2f_c$. Therefore, the conversion efficiency, defined as the ratio between output power of the desired frequency (-ies) and the total input power of the rectifier network 105, is upper-bounded by −3 dB. The DC component, although unsuitable in the backscattering operation, can be used to power the rectifier network 105 and other components of the circuit 100.

FIG. 5 shows the conversion efficiencies of the rectifier network 105 when using the proposed modified CW and the standard sinusoid CW. In the former case, the conversion efficiency is plotted as a function of the number of CW harmonics passed by the LC filter at the receive antenna 110 (e.g., LC circuit 120). In the latter case, the conversion efficiency is a function of the number of harmonics of the rectified CW passed to the reflect antenna. As the number of harmonics increases, the performance of the standard scheme using the sinusoid CW is upper-bounded by about −5 dB and the performance cannot be improved by admitting more harmonic components. As disclosed above, in some embodiments, the performance using the modified CW (e.g., defined by equation 2) can be efficiently improved by passing the harmonics at frequencies $f_c$ and $3f_c$ to the rectifier network 105. At this setting, the conversion efficiency achieves almost −3 dB, as predicted by the theoretical upper bound.

As illustrated in FIG. 1, the rectifier network 105 can include a full wave rectifier network having four Schottky diodes 170, arranged as shown in the figure. In other embodiments, the rectifier network 105 could include, e.g., two, six, or eight etc . . . , of the Schottky diodes 170. Based on the present disclosure, one skilled in the pertinent art would understand how to, e.g., using commercial circuit simulation software, calculate the appropriate modified waveforms, analogous to the waveform represented in equation (2), for different embodiments of the rectifier network 105.

As illustrated in FIG. 1, the transponder circuit 100 can be part of a tag-to-tag communication system 180 having an interrogator 185 configured to transmits the ambient RF signal 140 at the frequency $f_c$. Such a system 180 can include a plurality of the transponder circuits 100 configured in ST or RT states to communicate digital information via tag-to-tag communication.

Those skilled in the art to which this application relates will appreciate that other and further additions, deletions, substitutions and modifications may be made to the described embodiments.

What is claimed is:

1. A passive tag transponder circuit, comprising:
 a receive antenna configured to receive an ambient RF signal having a frequency of $f_c$, or, to receive a backscattered RF signal having a frequency of $2f_c$;
 a rectifier network; and
 a reflect antenna configured to receive a rectified output signal from the rectifier network, the rectified output signal having a frequency of $2f_c$ and configured to send a backscattered signal at the frequency of $2f_c$, wherein:
 the rectifier network is connected to receive an input corresponding to the ambient RF from the receive antenna and send the rectified output to the reflect antenna, and
 the ambient RF signal has a modified continuous waveform such that the rectified output has substantially no harmonic frequencies greater than $2f_c$.

2. The transponder circuit of claim 1, further including a first LC circuit connected to the receive antenna, wherein the first LC circuit is switchably configured to tune the receive antenna to the frequency of $f_c$, or, to the frequency of $2f_c$.

3. The transponder circuit of claim 2, further including a first impedance matching stub connected to the first LC circuit and switchably configured to feed the input to the rectifier network, or, to a logic circuit of the transponder circuit.

4. The transponder circuit of claim 1, further including a second impedance matching stub connected to the rectifier network and to a second LC circuit, the second LC circuit connected to the reflect antenna, wherein the second LC circuit configured to tune the reflect antenna to the frequency of $2f_c$.

5. The transponder circuit of claim 4, further including a switch connected to the second LC circuit, the switch configured to switch loads attached to the reflected antenna to have different impedances for representing information bits.

6. The transponder circuit of claim 1, further including a logic module, the logic module connected to:
- switch the receive antenna to be tuned the frequency of $f_c$, or, the frequency of $2f_c$;
- switch the input corresponding to the ambient RF to the rectifier network, or, switch an input from the receive antenna corresponding to the backscattered RF signal to the logic module; and
- switch between open and short circuits of the reflect antenna to modulate information bits into the backscattered RF signal sent by the reflect antenna.

7. The transponder circuit of claim 6, wherein the logic module further includes a demodulation circuit configured to demodulate the backscattered RF signal fed to the logic circuit.

8. The transponder circuit of claim 1, wherein the receive antenna and the reflect antenna are combined in a single antenna.

9. The transponder circuit of claim 1, wherein the rectifier network has four Schottky diodes.

10. The transponder circuit of claim 1, wherein the transponder circuit is part of a tag-to-tag communication system having an interrogator configured to transmit the ambient RF signal at the frequency $f_c$.

11. The transponder circuit of claim 1, wherein the ambient RF signal has a sinusoid continuous waveform.

12. The transponder circuit of claim 1, wherein the modified continuous waveform has a modified sinusoidal continuous waveform of:

$$x(t)=\text{sign}(\sin 2\pi f_c t)\cdot\sqrt{2/3}A_c(\cos(4\pi f_c t+\pi)+1),$$

where $A_c$ is an amplitude of the ambient RF signal at the frequency $f_c$, and thereby, the rectified output with substantially no harmonic frequencies greater than $2f_c$ has an increased output power as compared to when the ambient RF signal has an unmodified sinusoidal continuous waveform.

* * * * *